United States Patent [19]

Nohara et al.

[11] Patent Number: 4,618,888
[45] Date of Patent: Oct. 21, 1986

[54] SCRAMBLING SYSTEM OF TELEVISION SIGNAL

[75] Inventors: Kazunori Nohara, Moriguchi; Katsuo Tanmatsu, Katano; Nobukazu Hosoya, Nara; Takeshi Higashino, Daito, all of Japan

[73] Assignee: Sanyo Electric Co., Ltd., Osaka, Japan

[21] Appl. No.: 581,158

[22] Filed: Feb. 17, 1984

[30] Foreign Application Priority Data

Feb. 18, 1983 [JP] Japan .................. 58-26485

[51] Int. Cl.$^4$ ........................................... H04N 7/167
[52] U.S. Cl. ..................................... 358/120; 358/124
[58] Field of Search ................................ 358/120, 124

[56] References Cited

U.S. PATENT DOCUMENTS

| 3,081,376 | 3/1963 | Loughlin et al. | 358/120 |
|---|---|---|---|
| 3,729,576 | 4/1973 | Court | 358/124 |
| 4,022,972 | 5/1977 | Pires | 358/124 |
| 4,319,273 | 3/1982 | Nossem | 358/120 |
| 4,408,225 | 10/1983 | Ensinger et al. | 358/120 |
| 4,424,532 | 1/1984 | Toonder et al. | 358/120 |
| 4,471,379 | 9/1984 | Stephens | 358/120 |
| 4,527,195 | 7/1985 | Cheung | 358/120 |
| 4,533,949 | 8/1985 | Fujimura et al. | 358/122 |

FOREIGN PATENT DOCUMENTS 55-88481 7/1980 Japan .

Primary Examiner—S. C. Buczinski
Attorney, Agent, or Firm—Armstrong, Nikaido, Marmelstein & Kubovcik

[57] ABSTRACT

A scrambling system of television signal includes a circuit for eliminating vertical sync pulses in a vertical sync pulse period and equivalent pulses in first and second equivalent pulse periods at opposite ends of said vertical sync pulse period. In place of the eliminated pulses, substitute pulses having a frequency equal to an integer times the frequency of horizontal sync pulses are deposited. A framing code inserting circuit is provided for inserting at least one framing code in the substituted pulses. The framing code is carrying information how the television signal is scrambled.

14 Claims, 13 Drawing Figures

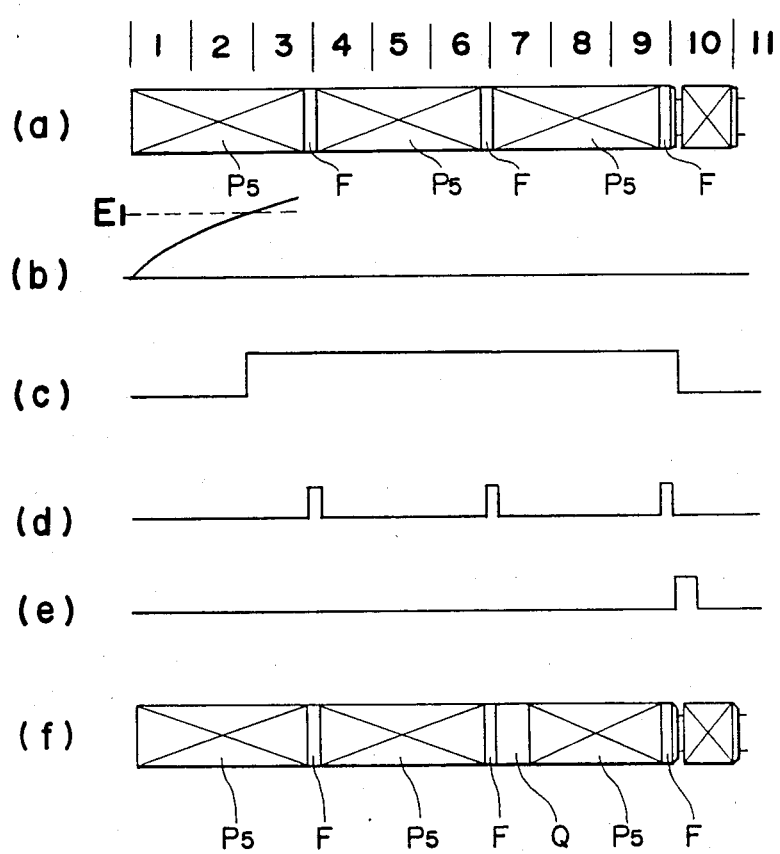

SCRAMBLING SYSTEM OF TELEVISION SIGNAL

BACKGROUND OF THE INVENTION

1. Field of the invention

The present invention relates generally to a subscription television system (pay-television system) and, more particularly, to a scrambling system of a television signal which may be received by any television receiver but can be reproduced properly only by the television receivers of the subscribers and can not be reproduced properly by the television receivers of non-subscribers.

2. Description of the Prior Art

In some subscription television system, it is desired that the television broadcasting service is charged to each subscriber not only by the channels, but by the programs. This can be accomplished by broadcasting a scrambled television signal which can not be properly reproduced by the normal television receiver, but can be properly reproduced by the television receiver of an authorized system subscriber by the employment of a suitable decoder.

According to the prior art scrambling system, the television signal is scrambled by merely changing the polarity of the video signal or by a minor change in the synchronizing pulses. Such simple scrambling methods, however, may be easily descrambled, or unscrambled, and therefore, the television programs can be easily reproduced by non-subscribers. On the contrary, if the television signal is scrambled in a complex manner, it becomes not only difficult to descramble the signal, but also may result in deterioration in the reproduced picture.

SUMMARY OF THE INVENTION

The present invention has been developed with a view to substantially solving the above described disadvantages and has for its essential object to provide a scrambling system of the television signal which can not be reproduced by non-subscribers and which can be descrambled without any deterioration in the reproduced picture.

In accomplishing these and other objects, a scrambling system of the television signal according to the present invention has an outstanding feature such that the vertical sync pulses in the vertical sync pulse period and equalizing pulses in the equalizing pulse periods appearing before and after the vertical sync pulse period are eliminated and, instead, substitute pulses having a frequency equal to N times (N is an integer) the frequency of the horizontal sync pulses and at least one framing code are inserted, thereby preventing the normal television receivers from receiving any vertical sync pulses, disabling the proper reproduction of the picture. The framing code is provided to carry information how the television signal is scrambled.

Another outstanding feature according to the present invention is such that the level of the video signal is shifted downwardly by a predetermined amount with respect to the pedestal level, and the video signal may be further inverted to change the polarity, thereby preventing the normal television receivers from catching not only the vertical but also horizontal sync pulses, resulting in a further scrambling effect of the television signal.

In addition to the above, according to the present invention, the above-mentioned substitute pulses can be imposed on all the horizontal sync pulses and blank video signals in the vertical blanking period.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIG. 8 shows waveforms for indicating the operation of circuit of FIG. 7;

DESCRIPTION OF THE PREFERRED EMBODIMENTS

Figure 1:
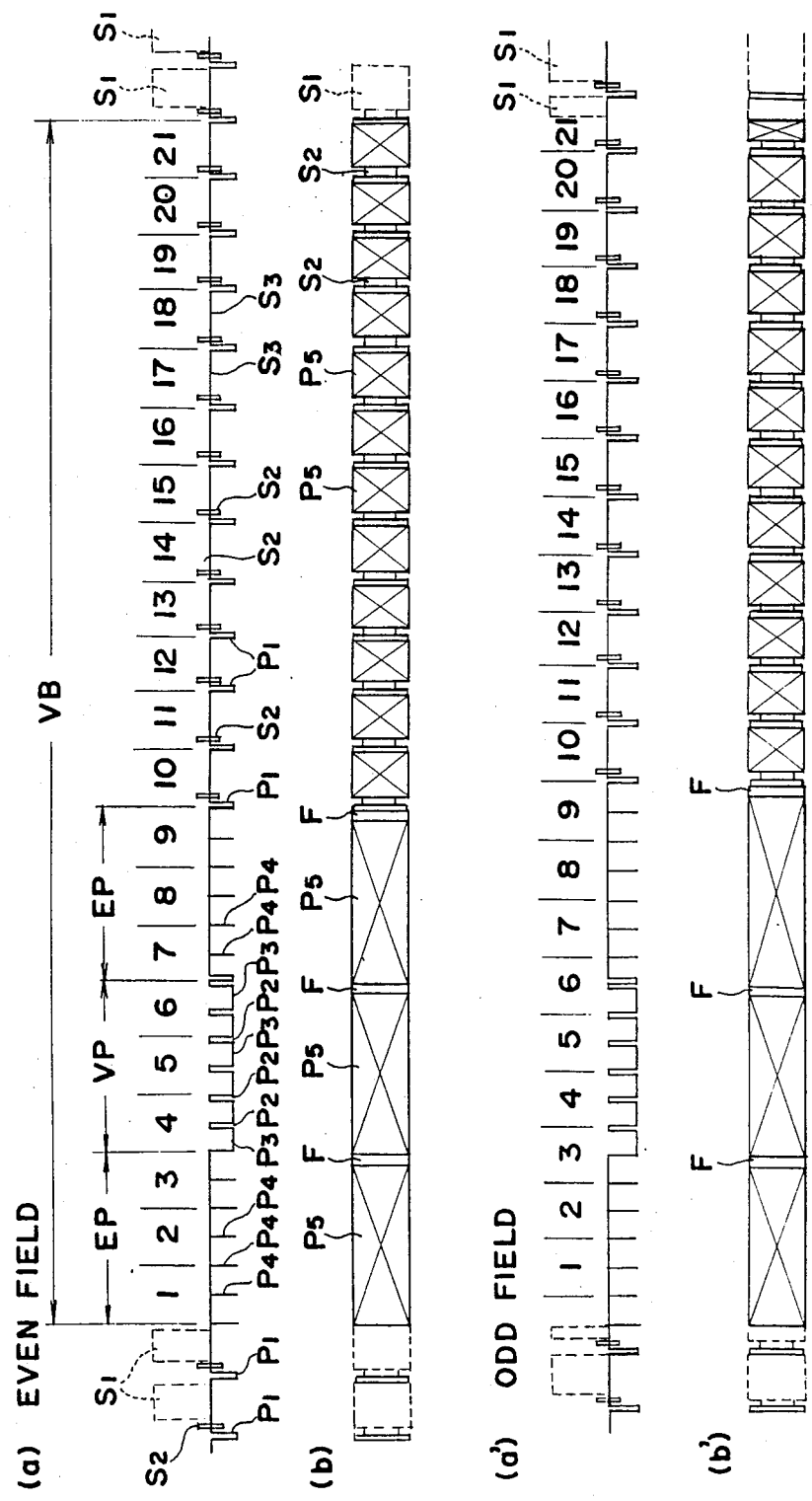
FIG. 1 is a diagrammatic view of waveforms of the television signal before and after it is scrambled, in which waveforms (a) and (b) represent even field, and waveforms (a') and (b') represent odd field.

Referring to FIG. 1, a waveform (a) represents a television signal of an even field particularly the vertical blanking period VB before being scrambled. In the illustration: P1 represents a horizontal sync pulse; S1 represents a video signal; S2 represents a color burst signal; P3 represents a vertical sync pulse formed by separation pulses P2; and P4 represents equalizing pulses provided in equalizing pulse periods EP appearing before and after the vertical sync pulse period VP, and each being 3H lines long. Also, in the illustration, the serial numbers from 1 to 21 represent the line number.

A waveform (b) represents a television signal which has been scrambled from the television signal of waveform (a) through the scrambling system according to the present invention. In waveform (b), the equalizing pulses P4 and vertical sync pulses P3 appearing in lines 1 to 9 are eliminated and, instead, substitute pulses P5, having a frequency equal to N times the frequency fH of horizontal sync pulses P1, wherein N is an integer, are provided with framing codes F inserted at three positions suitably separated from each other. The three framing codes F have exactly the same code pattern as each other, and carry information of television signal scrambling, such as how the television signal is scrambled. It is to be noted that the framing codes F are connected to the substitute pulses P5 with no break in continuity (i.e. they have the same frequency and phase).

Since the vertical sync pulses P3 and equalizing pulses P4 are eliminated and the substitute pulses P5 are placed instead at vertical sync pulse period VP and equalizing pulse periods EPs, it is impossible to effect the vertical synchronization by the normal television receiver, resulting in an indiscernible picture.

In order to increase the scrambling effect, the video signals S1, appearing in lines other than lines 1 to 21, can be shifted downwardly for a predetermined amount from the clamp level as described below.

Figure 2:
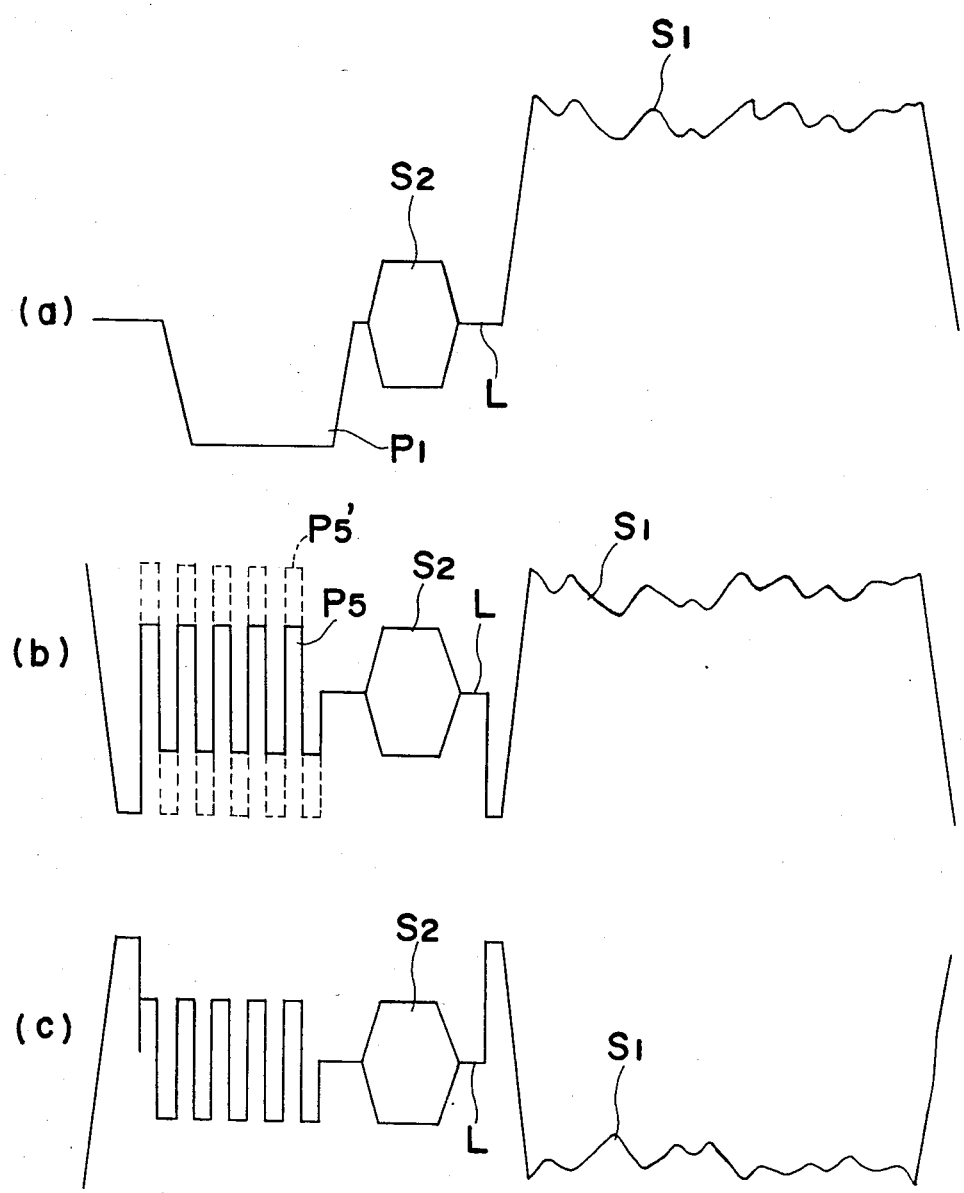
FIG. 2 shows waveforms of 1H line period of the original television signal and scrambled television signals in two different stages.

Referring to FIG. 2, a waveform (a) shows a television signal of 1H length before being scrambled, in which P1 is a horizontal sync pulse, S2 is a color burst signal, L is pedestal level and S1 is video signal. A waveform (b) shows a condition of the television signal in which the video signal S1 is shifted down for a predetermined amount. This amount may be such that when the amplitude of the video signal from the pedestal level L to the peak point for the color white is 70 and the amplitude of the horizontal sync pulse P1 is −30, the shift amount of the video signal is set equal to a half of the video signal amplitude, i.e., equal to 35. If this shift is done, it not only results in the change of luminance, but also results in difficulty in horizontal synchronization by the television receiver, because the average DC level of the video signal is dropped. More specifically, in the television receiver, the horizontal sync pulses P1 are detected when such a pulse P1 falls below a predetermined threshold level, and if the above shift is done, pulses other than P1 may be detected.

Still referring to FIG. 2, to further emphasize the scrambling effect, the horizontal sync pulse P1 is replaced by substituted pulses P5, as shown in waveform (b). In this case, the amplitude of the substituted pulses P5 may be approximately equal to that of the pulse P1 as indicated by a dotted line P5', but it is preferable to render it small as indicated by a real line P5, from the view point of horizontal sync pulse detection.

A waveform (c) in FIG. 2 shows a condition in which the shifted video signal S1 is inverted, thereby yet further emphasizing the scrambling effect.

Figure 3:
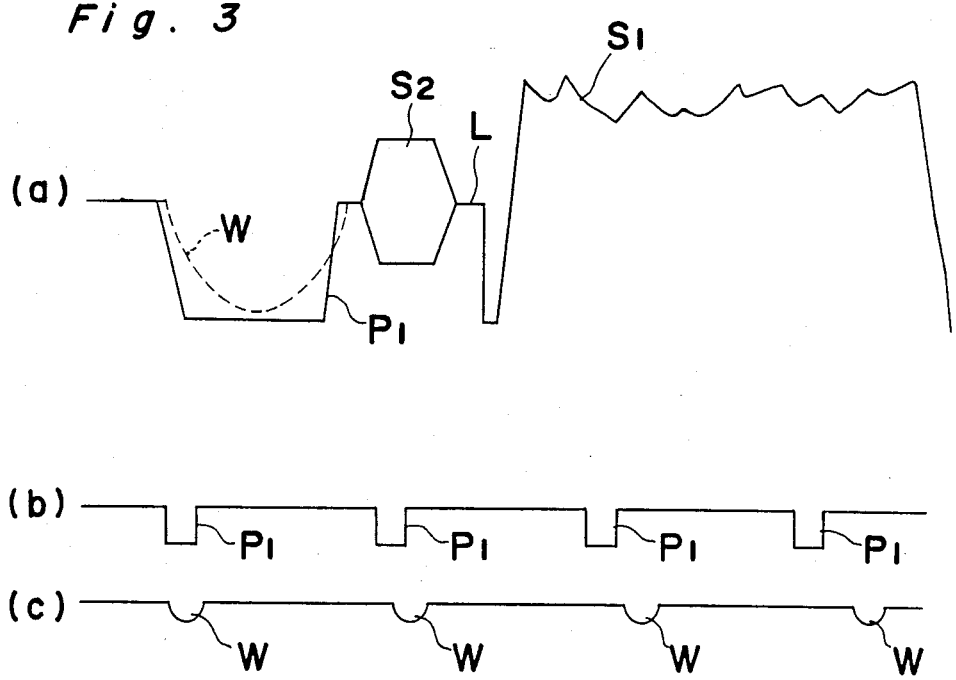
FIG. 3 shows waveforms of the television signal of 1H line period in which the video signal is shifted down, horizontal sync pulses P1 and deformation pulses W to be replaced by the pulses P1.

Referring to FIG. 3, instead of replacing the horizontal sync pulses P1 with substitute pulses P5, the horizontal sync pulses P1 can be replaced with counterfeit pulses, such as semi-circular pulses W (FIG. 3, waveform (c)) having a frequency fH-d, which is different from that of the horizontal sync pulses P1. When this is done, since the phase of the semi-circular pulses W is not equal to that of the horizontal sync pulses P1, the horizontal synchronization in the television receiver can not be done properly, thereby resulting in the scrambling effect.

Figure 4:
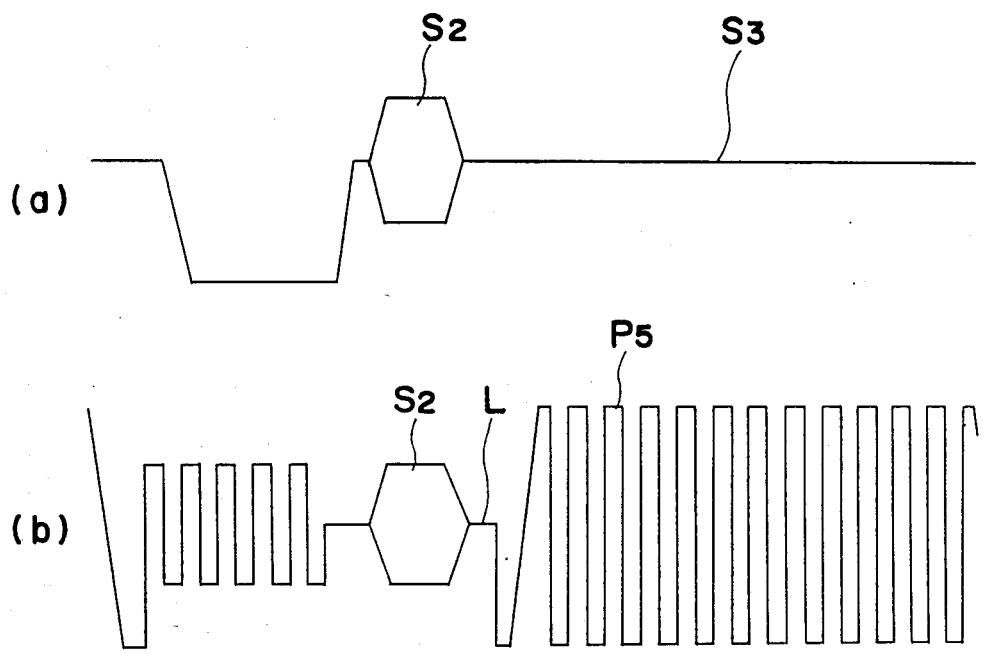
FIG. 4 shows waveforms of the television signal of 1H line period in the vertical blanking period before and after scrambling.

According to the preferred embodiment, in the case where the downward shift mentioned above is effected, the downward shift can be applied not only to the video signals S1 appearing in lines other than lines 1 to 21, but also to blank video signals S3 (appearing in lines 1 to 21 at corresponding portions where the video signals S1 are to be located), such as shown in FIG. 1, waveform (a) or FIG. 4, waveform (a). By the downward shift of the blank video signals S3, a number of negative going pulses (or one long negative going pulse) are formed, which may cause the vertical synchronization. Accordingly, it is preferable to add substitute pulses P5 to the shifted down blank video signals S3, as indicated in FIG. 4 waveform (b). Thus, the average level of the substitute pulses P5 is approximately equal to the pedestal level L. Thus, the shifted down blank video signals S3 may not be detected as an apparent vertical sync pulses in the television receiver, thereby refraining the television signal from any vertical synchronization. It is to be noted that the color burst signals should be maintained as they are without giving any scrambling effect.

The above description is particularly directed to the scrambling of a television signal of even fields, such as shown in FIG. 1 waveforms (a) and (b). The scrambling of a television signal of odd fields can be carried out substantially in the same manner as the even fields with some minor changes due to the difference of line position along the television signal. As is apparent from FIG. 1 waveforms (a') and (b'), one difference is, e.g., the length of equalizing pulse period EP of the second occurrence which is longer in the odd field. Another difference is in the line 21. In the even field, the line 21 carries blank video signal S3, but in the odd field, the line 21 carries both blank video signal S3 and normal video signal S1. Thus, in the odd field, line 21, the substitute pulses P5 are added only in the first half portion.

In the lines carrying a color burst signal S2, no matter whether the line is in the blanking period VB or not, the color burst signal S2 is maintained as they are with no scrambling effect. If the color burst signal S2 is once scrambled, it is very difficult to descramble it. Even if it is descrambled, 3.58 MHz pulses may be deteriorated, adversely affecting the reproduced picture.

Next, the description will be directed to a scrambling circuit according to the first embodiment of the present invention. The scrambling circuit may by provided in the television signal transmitter, such as in the television broadcasting station, for effecting the above described scramble.

Figure 5:
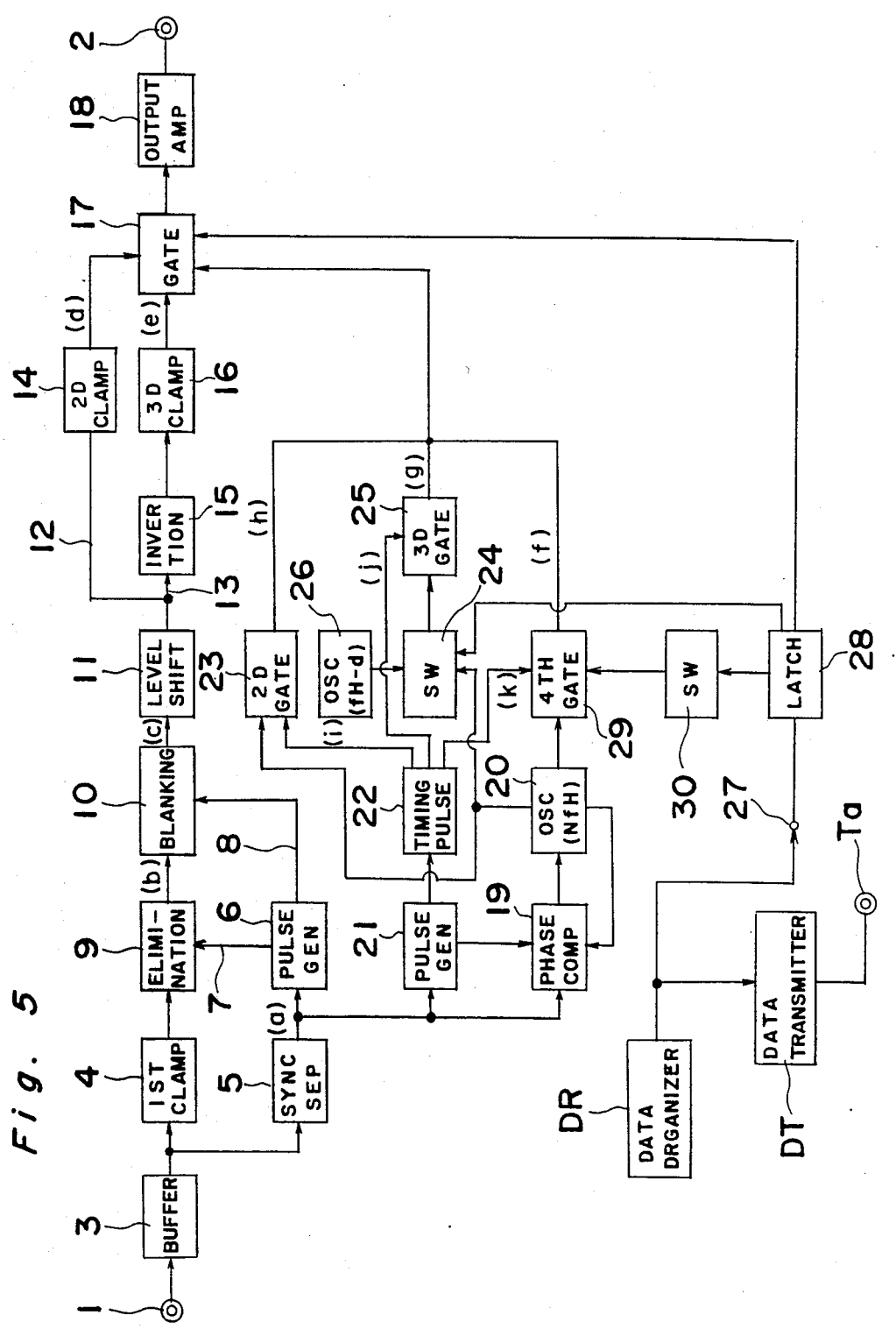
FIG. 5 shows a circuit diagram for scrambling the television signal according to the first embodiment of the present invention.

Referring to FIG. 5, the scrambling circuit includes an input 1 to which a non-scrambled, or original, television signal, such as shown in FIG. 1, waveform (a) and (a'), is applied, and an output 2 from which a scrambled television signal, such as shown in FIG. 1 waveforms (b) and (b'), is produced.

At a lower portion in FIG. 5, a data organizer DR is provided which forms scrambling data containing the framing code F and, if necessary, other codes. The scrambling data from data organizer DR is applied through an input 27 to a latch 28 which stores the scrambling data. The latch 28 is connected to a switching circuit 30 which permits only the framing code F to pass therethrough. Thus, a fourth gate circuit 29 connected to switching circuit 30 receives the framing code F from latch 28 via switching circuit 30. Based on the framing code F, latch 28 produces command signals which are applied to a mode selection switch 24 and to a gate circuit 17. The scrambling data from organizer DR is also applied to a data transmitter DT which transmits from an output Ta the scrambling data to each subscriber in a parallel relationship with the scrambled television signal, e.g., through an exclusive separate channel preserved for the data transmission.

Figure 6:
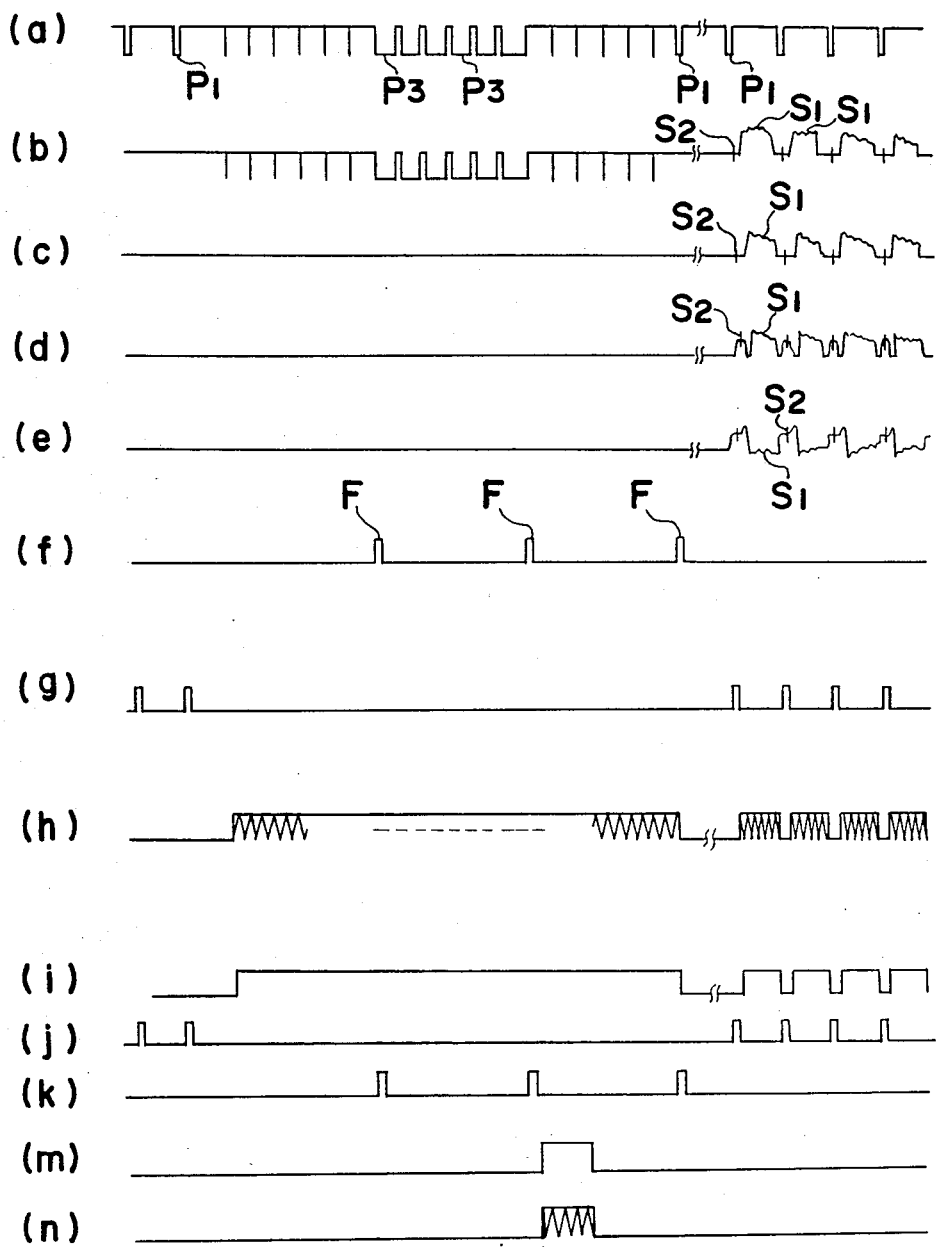
FIG. 6 shows waveforms obtained at various points in the circuit of FIG. 5.

In the illustration, a reference number 3 designates a buffer amplifier, and 4 designates a first clamping circuit for clamping the pedestal level L of the television signal. 5 is a sync separator for separating sync pulses from the television signal and produces a separated sync pulse signal, such as shown in FIG. 6, waveform (a). 6 is a pulse generator for producing a first pulse through a line 7 to an elimination circuit 9, and a second pulse through a line 8 to a blanking circuit 10. The first pulse is synchronized with the horizontal sync pulse P1, but its pulse width is slightly wider than the horizontal sync pulse P1. The second pulse is a wide pulse which covers lines 1 through 9. By the first pulses from pulse generator 6, elimination circuit 9 eliminates the horizontal sync pulses P1 from the television signal applied thereto from first clamping circuit 4, and produces a signal such as shown in FIG. 6, waveform (b). By the second pulse from pulse generator 6, blanking circuit 10 cuts off all the pulses contained in the lines 1 through 9. Thus, blanking circuit 10 produces a signal such as shown in FIG. 6, waveform (c).

A reference number 11 designates a level shift circuit for shifting down the obtained signal, except the color burst signal and its surrounding portion, for a predetermined amount. Its output signal is applied both to a second clamping circuit 14 and to an inversion circuit 15. The second clamping circuit 14 produces a non-inverted video signal, such as shown in FIG. 6, waveform (d), which is applied to gate circuit 17. The inversion circuit 15 produces a signal which is applied through a third clamping circuit 16 to gate circuit 17. Thus, the third clamping circuit 16 produces an inverted video signal, such as shown in FIG. 6, waveform (e). The second and third clamping circuits 14 and 16 are provided to make the reference level, such as pedestal level L, of the inverted and non-inverted video signals even with each other. By the command signal from latch 28, the gate circuit 17 selects either inverted or non-inverted video signal. For example, it may be so programmed as to alternately select the inverted and non-inverted video signals relatively to the field change, or television program change. Or, the selection may be effected at random.

A reference number 19 designates a phase comparator and 20 designates a voltage-controlled oscillator for generating pulses having a frequency NfH. The phase comparator 19 compares the phase of a composite sync pulse signal from sync separation circuit 5 and an output signal from voltage-controlled oscillator 20, and produces an output representing the phase difference. The signal produced from phase comparator 19 is applied to voltage-controlled oscillator 20, thereby defining a phase-locked loop (PLL) to stabilize the the oscillation. Thus, voltage-controlled oscillator 20 produces the substitute pulses P5 which are applied to a second gate circuit 23 and a mode selection switch 24. Since the equalizing pulses P4 in the composite sync pulse signal has a frequency equal to 2fH, which is not equal to fH, these pulses P4 adversely affect the PLL operation and, therefore, are eliminated in phase comparator 19 by the pulses from a second pulse generator 21.

The second pulse generator 21 also produces pulses synchronized with horizontal sync pulses P1 having a frequency fH, which are applied to a timing pulse generator 22. The timing pulse generator 22 produces three different timing pulse signals, such as shown in FIG. 6, waveforms (i), (j) and (k).

The first timing pulse signal (waveform (i)) is fed to the second gate 23. Thus, second gate 23 produces the substitute pulses P5 during the presence of the first timing pulse. Thus, second gate 23 produces an output signal, such as shown in FIG. 6, waveform (h).

The second timing pulse signal (waveform (j)) is fed to a third gate circuit 25 which also receives a signal from mode selection switch 24. Mode selection switch 24 receives the substitute pulses P5 from oscillator 20 and semi-circular pulses W from an oscillator 26. In accordance with a command signal from latch 28, either substitute pulses P5 or semi-circular pulses W are transmitted from mode selection switch 24 to third gate circuit 25. Thus, during the presence of the second timing pulse from the timing pulse generator 22 (corresponding to horizontal sync pulse periods in television signal excluding the equalizing pulse periods EP and vertical sync pulse period VP), third gate circuit 25 produces the selected signal from mode selection switch 24, such as shown in FIG. 6, waveform (g).

The third timing pulse signal (waveform (k)) is fed to the fourth gate circuit 29 which also receives the framing code F from the switching circuit 30. Thus, gate circuit 29 produces framing code F when the third timing pulse signal is present, such as shown in FIG. 6, waveform (f). The framing code F is shown by a single pulse in FIG. 6 or in FIG. 1, but actually it is defined by a number of bits in a binary code.

The output signals from gates 23, 25 and 29 are all applied to the gate 17, and in accordanCce with the timing pulse from the generator 22, such output signals and the selected video signal are sequentially produced from gate 17 and are applied to an output amplifier 18 and further to output 2.

Figure 7:
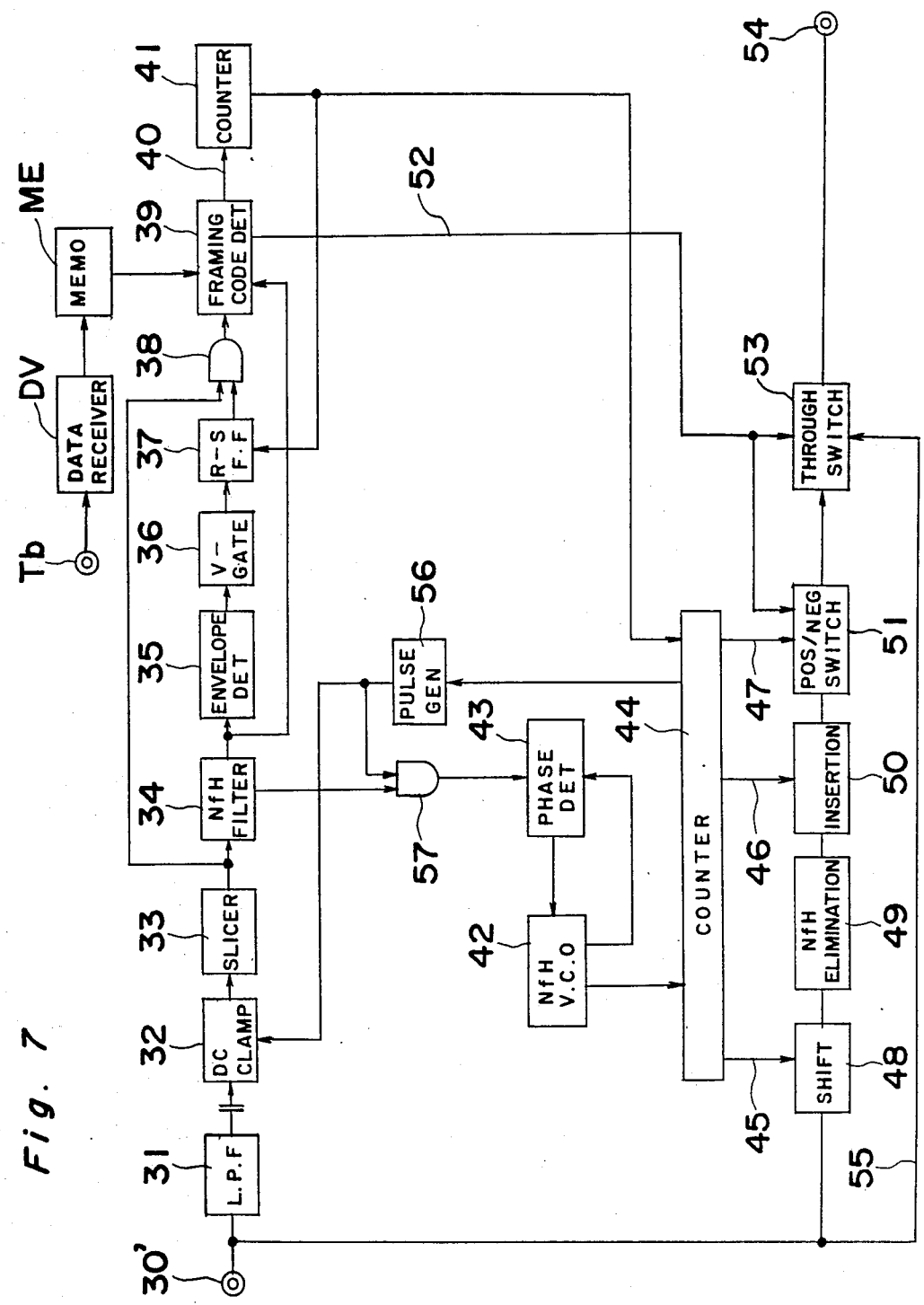
FIG. 7 shows a circuit diagram for descrambling the television signal according to the first embodiment of the present invention.

Referring to FIG. 7, a descrambling circuit provided, e.g., in each subscriber, is shown. The descrambling circuit includes an input 30' for receiving the scrambled television signal, such as shown in FIG. 1 waveforms (b) and (b'), from the output 2 of the scrambling circuit of FIG. 5, and an output 54 for producing a descrambled television signal, such as shown in FIG. 1, waveform (a) and (a').

At an upper portion in FIG. 7, a data receiver DV is provided for receiving the scrambling data containing the framing code F through an input Tb from the data transmitter DT shown in FIG. 5. The framing code F is stored in a memory ME and is applied to a framing code detector 39.

A reference number 31 designates a low-pass filter for cutting off the color signal containing the color burst signal, 32 is a DC clamping circuit and 33 is a slicer for equalizing the amplitude of pulses of framing code F, since its amplitude may be undesirably changed during the transmission. 34 is an NfH filter, having a certain degree of continuity with respect to NfH Hz pulses. It is to be noted that filter 34 eliminates the video signal. 35 is an envelope detector defined by a capacitor (not shown) which is charged and discharged. The output from envelope detector 35 will not exceed a predetermined level E1 during the charge of a train of substitute pulses P5 in horizontal sync pulses P1, such as shown in FIG. 2, waveforms (b) and (c), or during the charge of a train of substitute pulses P5 in lines 10 to 21, such as shown in FIG. 1, waveform (b), because the number of pulses P5 in each train is not so many. But, during the charge of a train of substitute pulses P5 in lines 1 to 9, the output from envelope detector 35 exceeds the predetermined level E1, as shown in FIG. 8, waveforms (a) and (b).

When the output of envelope detector 35 exceeds the predetermined level E1, a V-gate 36 connected thereto opens. In response to the opening of V-gate 36, an R-S flip-flop 37 is set to produce HIGH, as shown in FIG. 8, waveform (c). An AND gate 38 is connected to R-S flip-flop 37, and is enabled by the HIGH from flip-flop 37, thereby transmitting the output from slicer 33 to the framing code detector 39. In the framing code detector 39, framing code F from the slicer 33 is compared with framing code F from memory ME. If these two framing codes are the same as each other, the detector 39 produces a signal (FIG. 8, waveform (d)) for effecting the descrambling. Such a signal (FIG. 8, waveform (d)) is applied through a line 52 to a through-switch circuit 53 to permit the transmission of descrambled signal from positive/negative switch circuit 51 to output 54 as will be described in detail later. Such a signal (FIG. 8, waveform (d)) includes a command signal indicating whether the video signal has been inverted or not. This command signal is applied through line 52 to positive/negative switch 51 for inverting the video signal, if needed, to return it back to the original figure.

If, on the contrary, these two framing codes are not the same as each other, the framing code detector 39 produces a signal which prevents circuit from carrying out the descrambling. In this case, the signal from the detector 39 actuates the through-switch circuit 53 such that the television signal applied to the input 30', no matter if it is scrambled or not, is directly transmitted to the output 54 via bypass line 55.

The comparison in the framing code detector 39 is carried out by the use of a shift register arrangement (not shown), which is driven by NfH pulses obtained from NfH filter 34. The framing code detector 39 produces a pulse upon detection of one framing code, and this pulse is applied through a line 40 to a modulo-3 counter 41 for counting the number of framing codes F. When the counter 41 has counted three framing codes, it produces a carry signal (FIG. 8, waveform (e)) which is applied to R-S flip-flop 37, thereby resetting the same. Thus, the output of R-S flip-flop 37 changes to LOW to disable AND gate 38. The carry signal from the counter 41 is also applied to a counter 44 which counter 44 then starts counting.

Still referring to FIG. 7, a reference number 42 designates a voltage-controlled oscillator for generating pulses having a frequency NfH. A phase detector 43 is provided to compare the phase of NfH pulse from oscillator 42 with NfH pulse from NfH filter 34 through AND gate 57, and produces a voltage signal representing the phase difference. The voltage signal is fed to the oscillator 42 to control the oscillation frequency in the PLL system. The generated NfH pulses from the oscillator 42 are applied to a counter 44 which starts counting the NfH pulses upon receipt of the carry signal from the counter 41 so as to form the composite sync pulses, and other timing pulses.

The scrambled television signal applied to the input 30' is fed in series through shift circuit 48, NfH pulse elimination circuit 49, insertion circuit 50, positive/negative switch 51 and through-switch circuit 53, thereby descrambling the television signal, step by step.

In the shift circuit 48 the television signal is shifted back to the original level. More specifically, the shift circuit 48 receives timing pulses from counter 44 at periods corresponding to the color burst signal and its surronding portion. Accordingly, the television signal excluding the color burst signal and its surrounding portion is shifted upward to return the television signal back to the original level.

Then, in the NfH pulse elimination circuit 49, the substitute pulses P5 are eliminated.

Next, in the insertion circuit 50, composite sync pulses transmitted thereto from counter 44 through line 46 are added to the television signal.

Then, in the positive/negative switch 51, the video signals which have been inverted in the scrambling circuit is again inverted back to the original video signal. Which video signals should be inverted by the positive/negative switch 51 is determined by the command signal applied thereto from framing code detector 39. Accordingly, the television signal produced from the positive/negative switch 51 is descrambled completely, and is transmitted via through-switch 53 to the output 54.

The counter 44 is also coupled to a pulse generator 56 which produces a wide pulse that covers lines 1 through 9 in each field. The wide pulse is applied to an AND gate 57, so that the AND gate 57 provides the NfH pulses to the phase detector 43 only during the lines 1 through 9. This arrangement prevents the phase detector 43 from receiving video signal which may cause an erroneous detection by the phase detector 43, because the phase detector 43 may take the video signal as a signal having a frequency NfH. The wide pulse is also applied to DC clamping circuit 32, because the circuit operation will be stabilized most when the DC clamp is carried out during that pulse period.

According to the above-described descrambling circuit, the counter 44 starts counting and supplying composite pulses and timing pulses in response to the carry signal from counter 41. Thus, the counter 44 starts its operation from line 10 of the very first field. Thus, lines 1 through 9 of the very first field are not provided with any composite pulses. But, since all the composite pulses are added in every lines of the subsequent fields, the missing of composite pulses in lines 1 through 9 of the very first field will not deteriorate the reproduced picture.

Figure 9A:
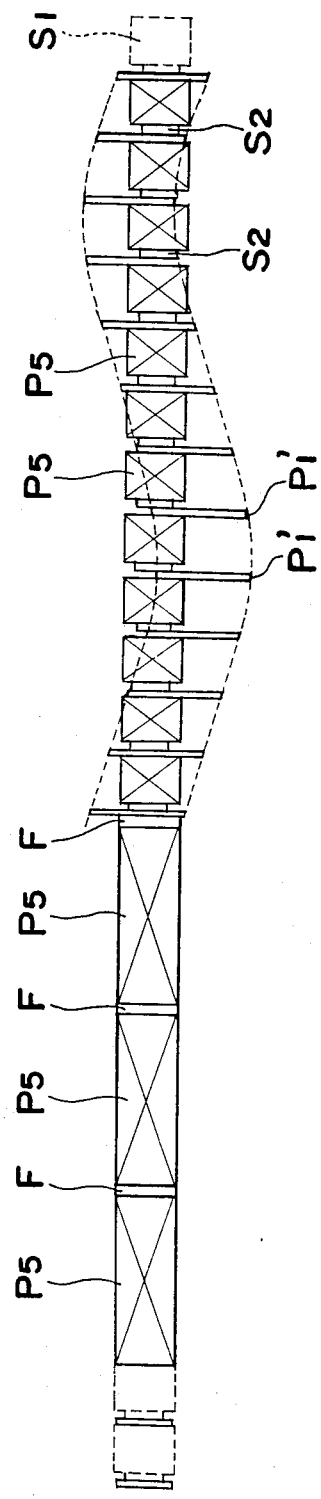
FIGS. 9(a) and 9(b) show a diagrammatic view of a waveform of the television signal after the scrambling.
Figure 9B:
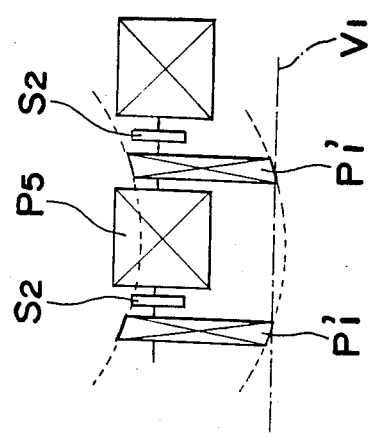

Referring to FIGS. 9(a) and 9(b), a first modification of a scrambling system according to the present invention is shown. In the above-described embodiment, horizontal sync pulses P1 have been replaced by substitute pulses P5, as best shown in FIG. 2, waveform (b), and the amplitude of the substitute pulses P5 is rendered to be small. According to the modification of FIGS. 9(a) and 9(b), the substituted pulses provided in place of horizontal sync pulses, which are indicated by a reference character P1', are carried on a sine wave indicated by a dotted line. Accordingly, the bottom peak points of the pulses P1' change in a sine wave fashion. The horizontal sync pulses are detected when the bottom peak points of the pulse falls below a certain level, such as V1 shown in FIG. 9(b). Since the bottom peak point changes as mentioned above, not all the pulses P1' are detected. Furthermore, even if it were detected, the point at which the detection is effected is not always at the left side edge, when viewed in FIG. 9(a) or 9(b), of the pulse P1', but it is sometimes effected at an intermediate point of the pulse width, as best shown in FIG. 9(b).

When the horizontal sync pulses are scrambled in the above described manner, some lines are dropped, and yet the displayed lines are not in alignment with each other.

The above described scrambling effect can be accomplished, for example, by adding a sine wave generator (not shown) between oscillator 20 and mode selection switch 24.

According to a second modification, although it has been described that the three framing codes F in each field have exactly the same code pattern as each other, they may be varied in relation to the field change or even within each field. This modification uses three different types of framing codes Fa, Fb and Fc selected from a number of different types having a function of 1-bit error correction.

The framing codes can be added in such a manner that, in one particular field, three framing codes, e.g., Fa, Fa, and Fa are added, in another particular field, three framing codes, e.g., Fb, Fb and Fb are added and in yet another particular field, three framing codes, e.g., Fc, Fc and Fc are added. The feature of this arrangement is such that the three framing codes in each field have exactly the same type as each other, but they may be varied in relation to the field change.

Alternatively, the framing codes can be added in such a manner that, in one particular field, three framing codes, e.g., Fa, Fb and Fc are added, in another particular field, three framing codes, e.g., Fa, Fa and Fc are added, and in yet another particular field, three framing codes, e.g., Fb, Fb and Fb are added. The feature of this arrangement is such that the type of three framing codes in each field are selected at random. That is, the framing codes in each field can be different from each other, or can be the same as each other.

By the above arrangement according to the second modification, the framing codes, which are inserted to provide timing information to reform horizontal and vertical sync pulses in the descrambling circuit, are not of the same type. Therefore, it is very difficult for the nonauthorized to analyze the scrambled television signal even by observing the waveform.

According to a third modification, the number of framing codes inserted in each field can be changed to different number, such as two. For example, of the three framing codes shown in FIG. 1, waveform (b), the first framing code on the left hand side can be eliminated. In this case, the substitute pulses P5 can be added in place of the eliminated framing code. Alternatively, the first framing code F, as well as the substitute pulses P5 in lines 1, 2 and 3, can be replaced with a zero level signal, in the same waveform (b).

The above modifications can be adapted solely to or in combination with the first embodiment or the second embodiment, the latter of which will be described below.

Figure 10:
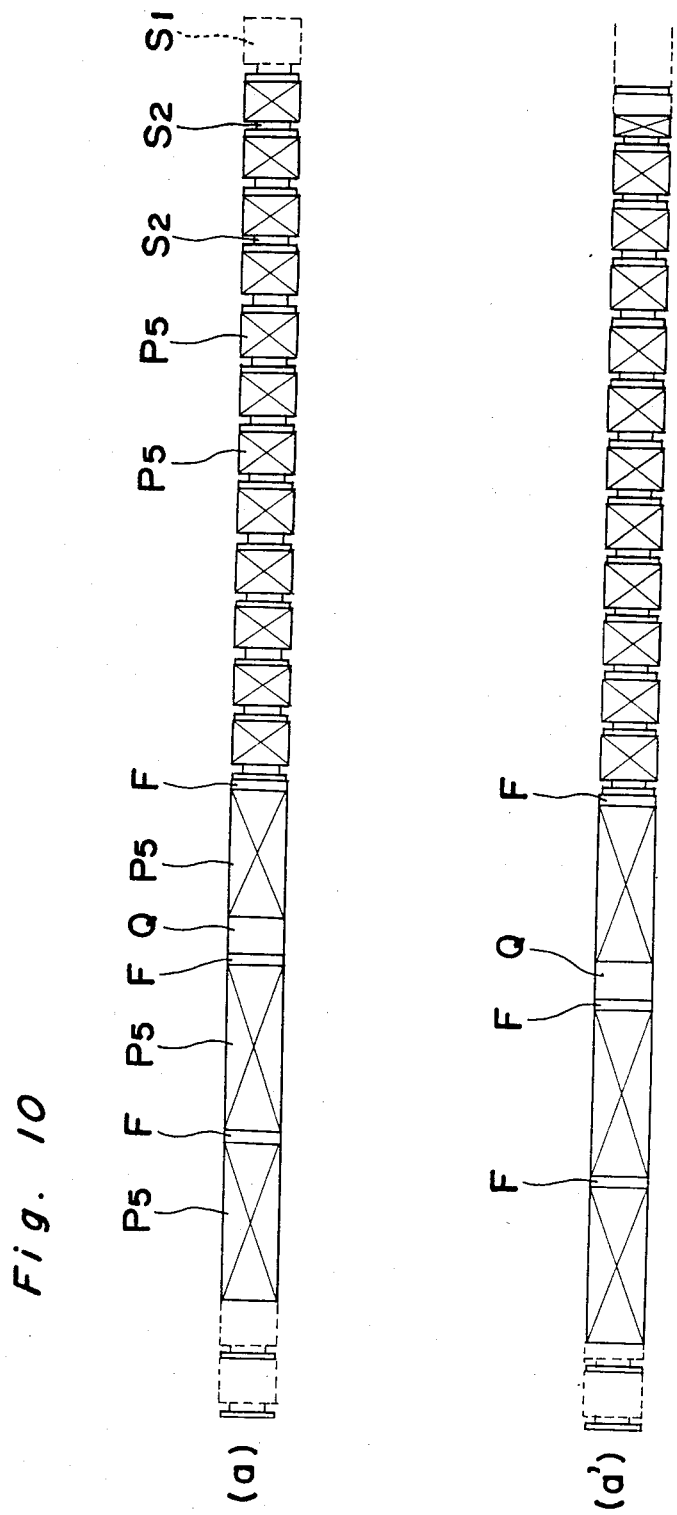
FIG. 10 is a diagrammatic view of waveforms of the television signal after scrambling, in which waveform (a) represents even field, and waveform (a') represents odd field.

Referring to FIG. 10, scrambled television signals, according to the second embodiment, for the even and odd field are shown. According to the second embodiment, in addition to the three framing codes, a channel information Q is further added which is inserted immediately after the second framing code. The channel information Q is also defined by a plurality of bits in a binary code, and it carries, e.g., television program information, channel information, or any other information.

Figure 11:
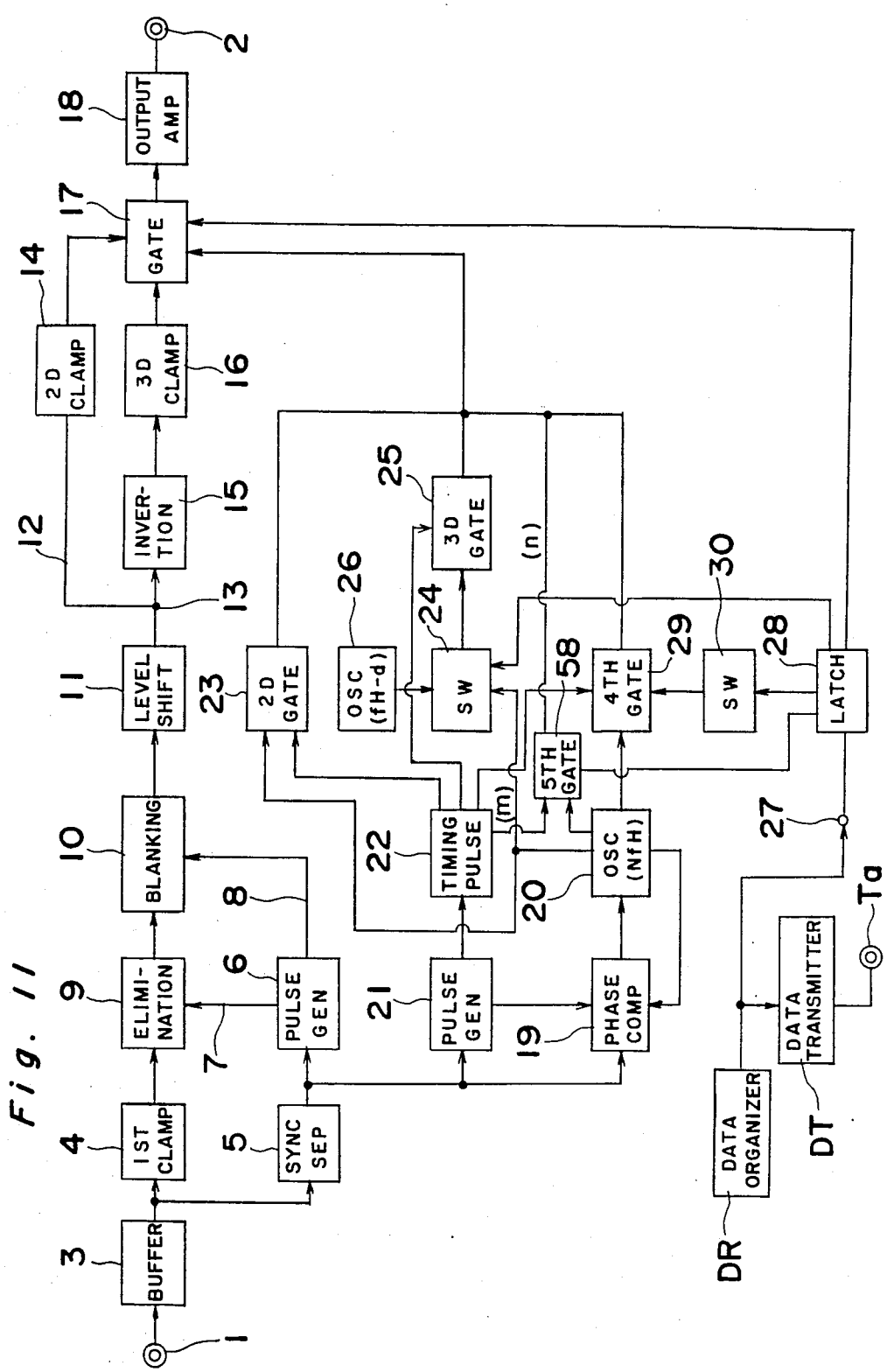
FIG. 11 is a circuit diagram for descrambling the television signal according to the second embodiment of the present invention.

Referring to FIG. 11, a scrambling circuit according to the second embodiment of the present invention is shown. When compared with the first embodiment, the scrambling circuit of the second embodiment further has a fifth gate 58 connected to the timing pulse generator 22 so that gate 58 receives a timing pulse, such as shown in FIG. 6, waveform (m). The fifth gate 58 is also connected to latch 28 for receiving the channel information Q, and to oscillator 20 for receiving NfH pulses. The output of gate 58 is connected to gate 17. The channel data for defining the channel information Q is organized in data organizer DR, and the organized channel data is stored in latch 28. Such a channel data is also transmitted through data transmitter DT to each subscriber via the exclusive separate channel.

Accordingly, when the timing pulse generator 22 supplies a timing pulse to gate 58, data applied from latch 28 is coded in gate 58 by the NfH pulses from oscillator 20. Thus, gate 58 produces channel information Q, such as shown in FIG. 6, waveform (n). The channel information Q is combined with other codes F and signals in gate 17 to form a scrambled television signal, such as shown in FIG. 10.

Figure 12:
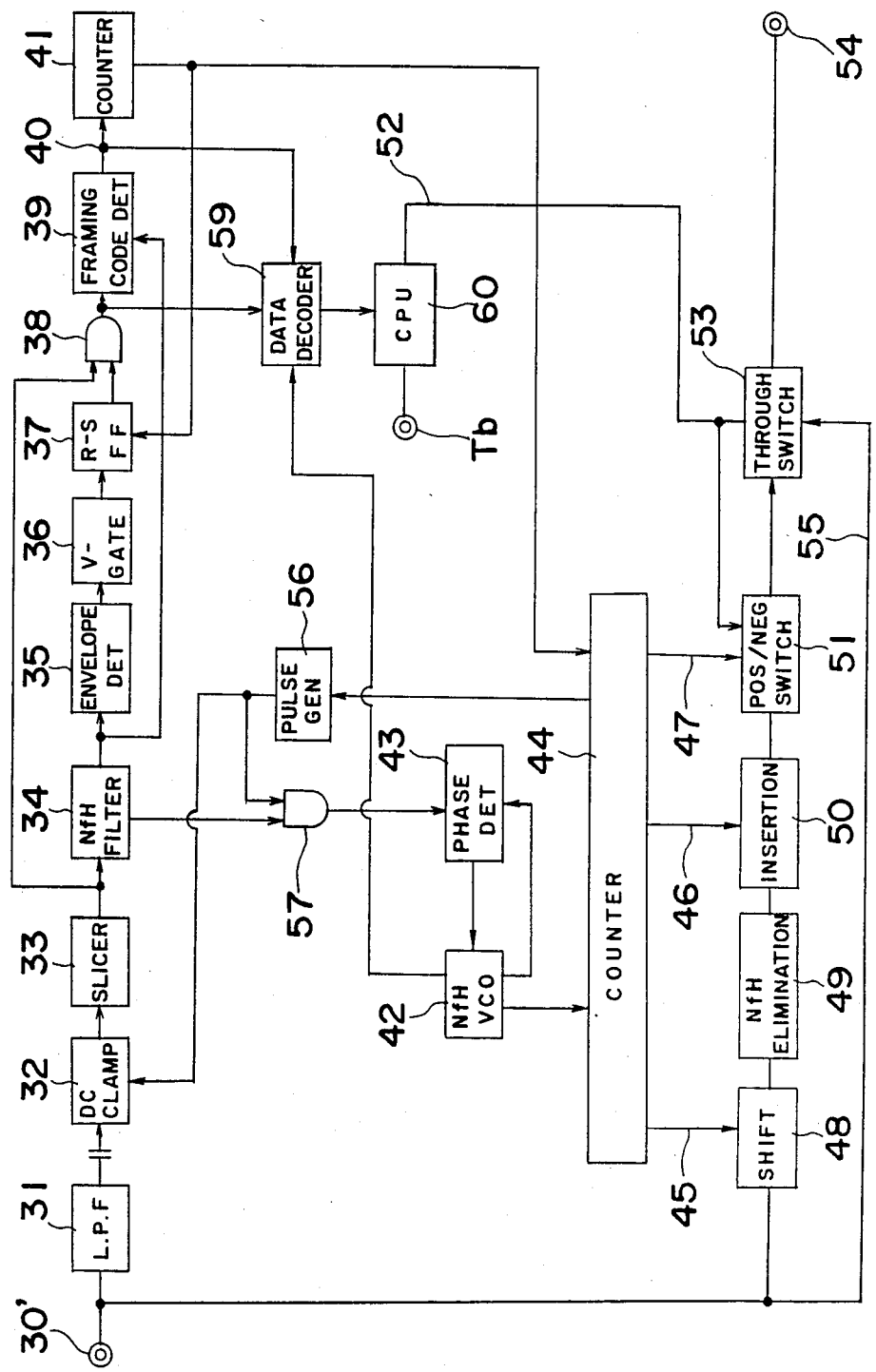
FIG. 12 is a circuit diagram for descrambling the television signal according to the second embodiment of the present invention.

Referring to FIG. 12, a descrambling circuit according to the second embodiment of the present invention is shown. When compared with the first embodiment, the descrambling circuit of the second embodiment has no data receiver DV and memory ME, but instead, it has a CPU (central processing unit) 60 connected to input Tb for receiving the channel data from the scrambling circuit through the exclusive separate channel. Furthermore, a data decoder 59 is provided, which is connected to receive output signals from oscillator 42, AND gate 38 and framing code detector 39. The output of data decoder 59 is connected to CPU 60, and output of CPU 60 is connected to positive/negative switch 51 and to through switch 53.

In operation, in the same manner as the first embodiment, the AND gate 38 produces scrambled television signal in a period when the R-S flip-flop 37 is producing HIGH (FIG. 8, waveform (c)), that is, for example, during lines 3 to 9. Therefore, in this period, AND gate 38 produces framing codes F and channel information Q, as indicated in FIG. 8, waveform (f). Driven by the NfH pulses from oscillator 42, the data decoder 59 receives and detects channel information Q appearing at the output of AND gate 38, the output of data decoder 59 is applied to CPU 60. The program information contained in the channel information Q, which is inserted in the blanking period and carried by the television signal, is compared in CPU 60 with program data which has been applied to CPU 60 through input Tb. It is to be noted that the data appearing at the input Tb is sent from, e.g., broadcasting station through the exclusive separate channel and is decoded in the receiver side.

If the compared result in CPU 60 is such that the two signals are substantially identical to each other, CPU 60 produces a command signal to through-switch 53. Accordingly, through-switch 53 is so turned as to connect output of positive/negative switch 51 to output 54.

On the contrary, if the compared result is such that the two signals are not identical to each other, CPU 60 produces a signal to through-switch 53, so that through-switch 53 is so turned as to connect the bypass line 55, carrying the signal received by the input 30', to output 54.

Furthermore, CPU 60 analyzes the scrambling data detected by the data decoder 59. If the analyzed result indicates that the video signal has been inverted, CPU 60 produces a control signal to positive/negative switch 51 to invert the video signal to bring it back to the proper form. If the analyzed result indicates that the video signal has not been inverted, CPU 60 produces a control signal which causes the positive/negative switch 51 to pass through the applied television signal without any change. No comparison is carried out in CPU 60 as to the scrambling data, because according to this embodiment, the scrambling data is not transmitted through the exclusive separate channel and, therefore, it is not present at input Tb.

Since other operations are the same as the first embodiment, a further description therefor is omitted for the sake of brevity.

It is to be noted that in place of channel information Q, subscriber information can be inserted. In this case, the channel information can be transferred through the exclusive separate channel. Furthermore, both the channel information and subscriber information can be inserted in the vertical blanking period. In this case, the subscriber information can be inserted, for example, immediately after the first framing code shown in FIG. 10, waveform (a).

It is also to be noted that the channel information and/or subscriber information can be inserted, not immediately after the framing code, but with a suitable spacing. In such a spacing, substitute pulses may be added.

It is further to be noted that, instead of the vertical blanking period, the channel information and/or subscriber information can be inserted in the horizontal blanking period.

According to the present invention, following meritorious effects can be obtained.

Since at least one framing code is inserted in the scrambled television signal, the television signal can be scrambled in a sophisticated manner without making the television signal complex. Furthermore, the descrambling in the subscriber's receiver can be carried out with a high accuracy, thereby providing pictures with no deterioration. But for the non-subscribers it is difficult to even analyze the scrambled television signal. Also, since the type of framing code can be changed at random in relation to the field change or even within each field, the above difficulty can be made more noticeable.

Also, since the channel information and/or subscriber information is further added in the blanking period, it is possible to eliminate the exclusive separate channel or, the information to be transmitted through the exclusive separate channel can be reduced.

Furthermore, since the information related to the television program can be added to each television program, the poling (the distribution of particular information to each subscriber) speed can be increased.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. A scrambling system for a television signal including horizontal sync pulses and having a vertical blanking period which includes a vertical sync pulse period and first and second equalizing pulse periods before and after said vertical sync pulse period, said system comprising:

means for eliminating vertical sync pulses in said vertical sync pulse period and equalizing pulses in said first and second equalizing pulse periods;

means for inserting substitute pulses in said vertical sync pulse period and in said first and second equalizing pulse periods with a plurality of framing code time periods between said substitute pulses remaining unoccupied by said substitute pulses, said substitute pulses having a frequency equal to an integral multiple of the frequency of said horizontal sync pulses; and means for inserting a framing code in each of said framing code time periods, said framing code being in the form of binary code pulses connected to said substitute pulses with no break in continuity and carrying information of how the television signal is scrambled.

2. A scrambling system as claimed in claim 1, further comprising means for shifting a level of a video signal downwardly by a predetermined amount in relation to a pedestal level.

3. A scrambling system as claimed in claim 2, further comprising means for inverting said video signal which has been shifted downwardly.

4. A scrambling system as claimed in claim 3, further comprising first gate means for selectively permitting either one of video signals produced by said shifting means or video signals produced by said inverting means to pass therethrough.

5. A scrambling system as claimed in claim 4, wherein said framing code carries a first command signal for controlling said first gate means to select one of said two video signals.

6. A scrambling system as claimed in claim 2, wherein said shifting means further shifts blank video signals.

7. A scrambling system as claimed in claim 6, wherein said substitute pulses are also inserted in said blank video signals which has been shifted down.

8. A scrambling system as claimed in claim 1, wherein said eliminating means further eliminates horizontal sync pulses.

9. A scrambling system as claimed in claim 8, further comprising means for inserting counterfeit pulses having a frequency which is different from that of horizontal sync pulses.

10. A scrambling system as claimed in claim 8, further comprising means for inserting substitute pulses in place of said horizontal sync pulses.

11. A scrambling system as claimed in claim 10, further comprising means for generating a sine wave signal of frequency lower than that of said horizontal sync pulses, and means for superimposing said sine wave signal on said substitute pulses inserted in place of said horizontal sync pulses.

12. A scrambling system as claimed in claim 1, wherein said substitute pulse inserting means inserts substitute pulses in said vertical sync pulse period and first and second equalizing pulse periods with another time period remaining unoccupied by said substitute pulses, and further comprising means for inserting an information code in said another time period, said information code carrying channel and subscriber information.

13. A scrambling system as claimed in claim 1, wherein said plurality of framing codes in each field are of the same type as each other.

14. A scrambling system as claimed in claim 13, wherein said plurality of framing codes vary with each field change.

* * * * *